United States Patent
Kuwahara et al.

(10) Patent No.: US 7,964,309 B2
(45) Date of Patent: Jun. 21, 2011

(54) NON-AQUEOUS ELECTROLYTE SECONDARY CELL AND METHOD FOR PRODUCING SAME

(75) Inventors: Tatsuyuki Kuwahara, Moriguchi (JP); Shinya Miyazaki, Moriguchi (JP)

(73) Assignee: Sanyo Electric Co., Ltd., Moriguchi-shi, Osaka (JP)

( * ) Notice: Subject to any disclaimer, the term of this patent is extended or adjusted under 35 U.S.C. 154(b) by 103 days.

(21) Appl. No.: 12/108,773

(22) Filed: Apr. 24, 2008

(65) Prior Publication Data

US 2008/0268340 A1    Oct. 30, 2008

(30) Foreign Application Priority Data

Apr. 27, 2007  (JP) ................................. 2007-118377

(51) Int. Cl.
    *H01M 4/50*    (2010.01)
(52) U.S. Cl. ..................... 429/223; 429/209; 429/218.1; 429/231.95
(58) Field of Classification Search .................. 429/223, 429/209, 218.1, 231.95
    See application file for complete search history.

(56) References Cited

U.S. PATENT DOCUMENTS

| | | | |
|---|---|---|---|
| 5,427,875 A | 6/1995 | Yamamoto et al. | |
| 5,824,434 A | 10/1998 | Kawakami et al. | |
| 2005/0227147 A1 | 10/2005 | Kogetsu et al. | |

FOREIGN PATENT DOCUMENTS

| | | |
|---|---|---|
| JP | 04-329268 A | 11/1992 |
| JP | 06-196199 A | 7/1994 |
| JP | 07-245105 A | 9/1995 |
| JP | 10-214640 A | 8/1998 |
| JP | 2002-117843 A | 4/2002 |
| JP | 2005-050707 A | 2/2005 |
| JP | 2005-322616 A | 11/2005 |

*Primary Examiner* — Jane Rhee
(74) *Attorney, Agent, or Firm* — Westerman, Hattori, Daniels & Adrian, LLP

(57) ABSTRACT

A non-aqueous electrolyte secondary cell that has high capacity and excellent cycle characteristic while preventing cell swelling is provided. The positive electrode of the cell has, as the positive electrode active material, lithium nickel composite oxide represented by $Li_xNi_{1-y}M_yO_z$ where $0.9<x\leq1.1$, $0\leq y\leq0.7$, $1.9\leq z\leq2.1$, and M contains at least one selected from Al, Co, and Mn. The amount of lithium carbonate on the surface of the lithium nickel composite oxide is 0.20 mass % or less relative to the lithium nickel composite oxide. On the surface of the positive electrode, a porous layer having inorganic oxide and lithium carbonate is provided.

11 Claims, No Drawings

NON-AQUEOUS ELECTROLYTE SECONDARY CELL AND METHOD FOR PRODUCING SAME

BACKGROUND OF THE INVENTION

1) Field of the Invention

The present invention relates to a non-aqueous electrolyte secondary cell using lithium nickel composite oxide as the positive electrode active material.

2) Description of the Related Art

In recent years, there has been rapid enhancement of functionality of mobile information terminals such as laptop computers, creating a need for cells of higher capacity.

Non-aqueous electrolyte secondary cells, for their high energy density and high capacity, are widely used as power sources for mobile appliances.

As the positive electrode active material for the non-aqueous electrolyte secondary cells, lithium cobaltate has been conventionally used. In recent years, cells using lithium nickel composite oxide instead of lithium cobaltate have been developed.

Use of lithium nickel composite oxide as the positive electrode active material enhances the discharge capacity as compared with use of lithium cobaltate.

The lithium nickel composite oxide used in the non-aqueous electrolyte secondary cells is synthesized by using alkali such as lithium hydroxide.

At the time of the synthesis, the alkali reacts with carbon dioxide gas existing in the surrounding atmosphere to generate lithium carbonate ($Li_2CO_3$). Since this lithium carbonate remains on the surface of the lithium nickel composite oxide, when the cell using the lithium nickel composite oxide is preserved at high temperature, the lithium nickel composite oxide is decomposed to generate carbon dioxide gas.

Thus, the cells using lithium nickel composite oxide have the problem of cell swelling.

Examples of the prior art techniques related to non-aqueous electrolyte secondary cells include Japanese Patent Application Publication Nos. 2002-117843 (patent document 1), 2005-322616 (patent document 2), 2005-50707 (patent document 3), 4-329268 (patent document 4), 10-214640 (patent document 5), 6-196199 (patent document 6), and 7-245105 (patent document 7).

Patent document 1 discloses: use of a compound having an olivine structure as the positive electrode active material; and containing lithium carbonate in the positive electrode active material layer. This technique is claimed to provide a cell excellent in high-temperature cycle characteristic.

This technique, however, has such a problem that the lithium carbonate is decomposed to generate carbon dioxide gas, resulting in cell swelling on a large scale.

Patent document 2 discloses use of a positive electrode active material containing lithium nickel composite oxide and a layer held on the surface of the lithium nickel composite oxide and composed of lithium carbonate, aluminum hydroxide, and aluminum oxide. This technique is claimed to provide a cell excellent in initial capacity and life characteristic.

This technique, however, has such a problem that the lithium carbonate is decomposed to generate carbon dioxide gas, resulting in cell swelling on a large scale.

Patent document 3 discloses dissolving cyclic acid anhydride and carbon dioxide gas in the non-aqueous electrolytic solution. This technique is claimed to provide a cell excellent in cycle characteristic and rapid charging characteristic.

This technique, however, still cannot provide sufficient cycle characteristic.

Patent document 4 discloses use of, as the positive electrode active material, $Li_xMO_2$ (M being at least one selected from Co and Ni) covered on its surface with lithium carbonate. This technique is claimed to inhibit rapid increase in temperature and rapid damage.

This technique, however, has such a problem that the lithium carbonate is decomposed to generate carbon dioxide gas, resulting in cell swelling on a large scale.

Patent document 5 discloses providing a free acid adsorbing layer between the positive electrode active material and the separator. This technique is claimed to provide a cell excellent in cycle characteristic.

This technique, however, still cannot provide sufficient cycle characteristic.

Patent document 6 discloses providing, between the positive electrode and the negative electrode, a multi-layer metal oxide film made of a bilayer formed into a mold shape. This technique is claimed to provide a cell excellent in cycle characteristic.

This technique, however, still cannot provide sufficient cycle characteristic.

Patent document 7 discloses use of a positive electrode active material wherein the surface of lithium nickelate is partially or entirely covered with lithium carbonate. This technique is claimed to provide a cell excellent in high-temperature preservation characteristic.

This technique, however, has such a problem that the lithium carbonate is decomposed to generate carbon dioxide gas, resulting in cell swelling on a large scale.

SUMMARY OF THE INVENTION

The present invention has been accomplished in order to solve the above problems, and it is an object of the present invention to provide a cell that is related to non-aqueous electrolyte secondary cells using lithium nickel composite oxide as the positive electrode active material and that is excellent in cycle characteristic while minimizing cell swelling.

In order to accomplish the above-mentioned object, a non-aqueous electrolyte secondary cell according to the present invention includes: a positive electrode having a positive electrode active material; a negative electrode having a negative electrode active material; and a non-aqueous electrolyte having a non-aqueous solvent and electrolytic salt. The positive electrode active material comprises lithium nickel composite oxide represented by $Li_xNi_{1-y}M_yO_z$ where $0.9 < x \leq 1.1$, $0 \leq y \leq 0.7$, $1.9 \leq z \leq 2.1$, and M contains at least one selected from Al, Co, and Mn. The amount of lithium carbonate on the surface of the lithium nickel composite oxide is 0.20 mass % or less relative to the lithium nickel composite oxide. The positive electrode has on the surface thereof a porous layer having inorganic oxide and lithium carbonate.

With this configuration, since the amount of lithium carbonate on the surface of the lithium nickel composite oxide is restricted to 0.20 mass % or less, the amount of carbon dioxide gas that is generated by decomposition of the lithium carbonate is reduced. This inhibits cell swelling.

Also, since the porous layer provided on the surface of the positive electrode keeps therein the non-aqueous electrolyte in a preferable manner, the amount of the non-aqueous electrolyte around the lithium nickel composite oxide is increased, thereby improving the cycle characteristic.

Further, although the lithium carbonate contained in the porous layer is decomposed to generate carbon dioxide gas, the carbon dioxide gas from the porous layer easily moves to the negative electrode. The carbon dioxide gas now at the negative electrode reacts with it to form a stable covering film on the surface of the negative electrode. This coating film inhibits the reaction between the negative electrode and the non-aqueous electrolyte. This improves the cycle characteristic of the cell.

Furthermore, the reaction of generating carbon dioxide gas from lithium carbonate contained in the porous layer is slower than the reaction of generating carbon dioxide gas from lithium carbonate on the surface of the lithium nickel composite oxide. This makes abrupt cell swelling difficult to occur. Also, as described above, the carbon dioxide gas from the porous layer easily moves to the negative electrode, and is consumed by reaction with the negative electrode.

Thus, the above configuration provides a non-aqueous electrolyte that has high capacity and excellent cycle characteristic, and that minimizes the increase in cell thickness.

As used herein, the surface of the lithium nickel composite oxide is intended to mean the surfaces of particles of the lithium nickel composite oxide, and the spacing between the particles is encompassed within the surface of the lithium nickel composite oxide. Specifically, the amount of lithium carbonate is determined by using the amount of carbon dioxide gas that is generated when the lithium nickel composite oxide is immersed in a hydrochloric acid solution.

In the above configuration, the amount of lithium carbonate contained in the porous layer may be 0.5 to 10 mass % relative to the positive electrode active material.

If the amount of the lithium carbonate contained in the porous layer is too small, a rough coating layer results from the reaction between the negative electrode and carbon dioxide gas generated by decomposition of the lithium carbonate, thus failing to sufficiently enhance the cycle characteristic. If the amount of the lithium carbonate contained in the porous layer is excessively large, part of the carbon dioxide gas generated by decomposition of the lithium carbonate cannot react with the negative electrode, resulting in cell swelling. In view of this, the content of the lithium carbonate is preferably specified within the claimed range.

As the inorganic oxide, at least one compound selected from the group consisting of $Al_2O_3$, $MgO$, $ZrO_2$, and $TiO_2$ is preferably used.

For the negative electrode to have on its surface a suitable covering film formed by the reaction between the carbon dioxide gas and the negative electrode, the negative electrode active material is preferably a carbon material such as artificial graphite, natural graphite, carbon black, and acetylene black.

In the above configuration, the thickness of the porous layer is 1.0 to 5.0 μm. Too small a thickness diminishes the effects provided by the porous layer, whereas too great a thickness is detrimental to permeation of the electrolytic solution. In view of this, the thickness of the porous layer is 1.0 to 5.0 μm.

The non-aqueous electrolyte secondary cell according to the present invention can be produced by the following method.

A method for producing a non-aqueous electrolyte secondary cell comprising a positive electrode having a positive electrode active material, a negative electrode having a negative electrode active material, and a non-aqueous electrolyte having a non-aqueous solvent and electrolytic salt, the method including the steps of: washing lithium nickel composite oxide with water to adjust the amount of lithium carbonate on the surface of the lithium nickel composite oxide to 0.2 mass % or less, the lithium nickel composite being represented by $Li_xNi_{1-y}M_yO_z$ where $0.9 < x \leq 1.1$, $0 \leq y \leq 0.7$, $1.9 \leq z \leq 2.1$, and M contains at least one selected from Al, Co, and Mn; preparing the positive electrode by causing a positive electrode current collector to hold the positive electrode active material containing the lithium nickel composite oxide having the lithium carbonate at 0.2 mass % or less on the surface of the lithium nickel composite oxide, as obtained in the washing step; and forming a porous layer on the surface of the positive electrode, the porous layer having inorganic oxide and lithium carbonate.

With this configuration, the lithium nickel composite oxide is washed with water. This facilitates adjusting the amount of lithium carbonate on the surface of the lithium nickel composite oxide to 0.2 mass % or less. Use of the thus washed lithium nickel composite oxide as the positive electrode active material in producing the positive electrode realizes a non-aqueous electrolyte secondary cell having high capacity, excellent cycle characteristic, and minimized cell swelling.

In the method for producing a non-aqueous electrolyte secondary cell, the porous layer forming step may include applying a slurry containing inorganic oxide, lithium carbonate, and a binding agent onto the surface of the positive electrode and drying the resulting product.

Also in the method, the thickness of the porous layer may be 1.0 to 5.0 μm.

Also in the method, the amount of the lithium carbonate contained in the porous layer may be 0.5 to 1.0 mass % relative to the positive electrode active material.

Also in the method, the inorganic oxide may be at least one compound selected from the group consisting of $Al_2O_3$, $MgO$, $ZrO_2$, and $TiO_2$.

Also in the method, the negative electrode active material may be composed of a carbon material.

Thus, the present invention provides a non-aqueous electrolyte secondary cell that has high capacity and excellent cycle characteristic while being capable of inhibiting cell swelling caused by generation of carbon dioxide gas.

DESCRIPTION OF THE PREFERRED EMBODIMENTS

The preferred embodiments of the present invention will be described with reference to examples. It will be understood that the present invention will not be limited by the examples below; modifications are possible without departing from the scope of the present invention.

Example 1

<Preparation of the Positive Electrode>

Nickel, cobalt, and aluminum were co-precipitated to have nickel-cobalt-aluminum hydroxide. Lithium hydroxide was added to the nickel-cobalt-aluminum hydroxide, followed by baking at 700° C., thus obtaining lithium nickel composite oxide containing cobalt and aluminum ($LiNi_{0.8}Co_{0.15}Al_{0.05}O_2$).

The element contents of the lithium nickel composite oxide were analyzed by ICP-AES (Inductive Coupling Plasma Emission Analysis).

(Washing Step)

The lithium nickel composite oxide and water were mixed together, and this mixture was kneaded in water. Then, the water was removed and the lithium nickel composite oxide was washed with water. The washed lithium nickel composite oxide was then dried, thus obtaining the positive electrode active material.

(Measurement of the Amount of Lithium Carbonate)

The positive electrode active material was sampled into a vial bottle. Then, 5 ml of hydrochloride (HCl) solution of 0.05

M (mole/liter) was injected into the bottle and mixed with the positive electrode active material. After the mixture was settled for some period of time, resulting gas was sampled by 0.1 ml and measured by gas chromatography. The amount of lithium carbonate was 0.1 mass % relative to the positive electrode active material. This reaction can be expressed as follows:

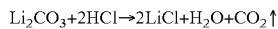

$Li_2CO_3 + 2HCl \rightarrow 2LiCl + H_2O + CO_2\uparrow$

Ninety mass parts of the positive electrode active material, 5 mass parts of carbon powder as a conducting agent, 5 mass parts of polyvinylidene fluoride (PVDF) as a binding agent, and N-methyl-2-pyrrolidone (NMP) were mixed together, thus preparing a positive electrode active material slurry. This positive electrode active material slurry was applied to both surfaces of a positive electrode current collector (20 μm thick) made of aluminum by doctor blading, followed by drying to form a positive electrode active material layer on the positive electrode current collector. Then, the resulting product was rolled with a compressive roller, thus preparing a positive electrode.

<Formation of the Porous Layer>

$Al_2O_3$, lithium carbonate, and polytetrafluoroethylene (PTFE) as a binding agent were mixed in water in which carboxymethyl cellulose (CMC) as a thickening agent was dissolved, thus obtaining an inorganic oxide slurry. The mass ratio of $Al_2O_3$, lithium carbonate, CMC, and PTFE was 85:10:3:2.

This slurry was applied to the surface of the positive electrode active material layer and dried, and on the positive electrode active material layer, a porous layer of 2 μm thick was formed. An area of the positive electrode with the porous layer was removed to measure the amount of lithium carbonate in the above-described manner. The lithium carbonate content in the porous layer was 0.5 mass % relative to the positive electrode active material.

<Preparation of the Negative Electrode>

Ninety-five mass parts of a negative electrode active material made of natural graphite, 5 mass parts of polyvinylidene fluoride (PVDF) as a binding agent, and N-methyl-pyrrolidone were mixed together, thus preparing a negative electrode active material slurry.

The negative electrode active material slurry was applied to both surfaces of a negative electrode current collector (18 μm thick) made of copper, followed by drying. Then, the dried electrode plate was rolled, thus preparing a negative electrode.

The potential of graphite is 0.1 V on the basis of lithium. The amounts of the active materials filled in the positive electrode and the negative electrode were adjusted such that the charge capacity ratio (negative electrode charge capacity/ positive electrode charge capacity) would be 1.1 at the potential of the positive electrode active material (4.3V on the basis of lithium in this example, while the voltage being 4.2 V), which served as a design reference.

<Preparation of the Electrode Assembly>

The positive electrode and the negative electrode were wound with a separator made of a polypropylene porous film therebetween, thus preparing a flat electrode assembly.

<Preparation of the Non-Aqueous Electrolyte>

Ethylene carbonate and diethyl carbonate were mixed together at a volume ratio of 3:7 (25° C.), and then $LiPF_6$ as electrolytic salt was dissolved therein at a rate of 1.0 (mol/liter), thus obtaining a non-aqueous electrolyte.

<Assembly of the Cell>

A sheet-formed laminate material was prepared having a five-layer structure composed of resin layer (polypropylene)/ adhesive layer/aluminum alloy layer/adhesive layer/resin layer (polypropylene). Then, the laminate material was folded to make a bottom portion, thus forming a cup-formed electrode assembly housing space. In a glove box with an argon atmosphere, the flat electrode assembly and the non-aqueous electrolyte were inserted into the housing space. Then, the outer casing was depressurized to cause the separator to be impregnated with the non-aqueous electrolyte, and the opening of the outer casing was sealed. Thus, a non-aqueous electrolyte secondary cell according to example 1 with a height of 62 mm, a width of 35 mm, and a thickness of 3.6 mm was prepared.

Comparative Example 1

A non-aqueous electrolyte secondary cell according to comparative example 1 was prepared in the same manner as in example 1 except that no porous layer was formed.

Comparative Example 2

A non-aqueous electrolyte secondary cell according to comparative example 2 was prepared in the same manner as in comparative example 1 except that the washing step was controlled to make the amount of lithium carbonate 0.2 mass % on the surface of the positive electrode active material.

Comparative Example 3

A non-aqueous electrolyte secondary cell according to comparative example 3 was prepared in the same manner as in comparative example 1 except that no washing step was carried out and the amount of lithium carbonate on the surface of the positive electrode active material was made 0.5 mass %.

Comparative Example 4

A non-aqueous electrolyte secondary cell according to comparative example 4 was prepared in the same manner as in comparative example 3 except that a change was made in the lithium content during preparation of the lithium nickel composite oxide to make the amount of lithium carbonate 0.6 mass % on the surface of the positive electrode active material.

Comparative Example 5

A non-aqueous electrolyte secondary cell according to comparative example 5 was prepared in the same manner as in comparative example 3 except that a change was made in the amount of the lithium source during preparation of the lithium nickel composite oxide to make the amount of lithium carbonate 0.8 mass % on the surface of the positive electrode active material.

Comparative Example 6

A non-aqueous electrolyte secondary cell according to comparative example 6 was prepared in the same manner as in example 1 except that no lithium carbonate was contained in the porous layer.

<High-Temperature Preservation Test>

Each of the cells was charged at a constant current of 650 mA to a voltage of 4.2 V, then at a constant voltage of 4.2 V to a current of 32 mA (all at 25° C.). Each of the charged cells was preserved in a thermostatic chamber of 85° C. for 3 hours to measure the thickness before and after preservation. The swelling rate of each cell was calculated from the following formula:

Swelling rate (%)=increase in thickness/initial thickness×100

<Cycle Characteristic Test>
Each of the cells was repeatedly charged and discharged under the following conditions to calculate the cycle characteristic from the following formula:

Charging: In a room of 25° C., each of the cells was charged at a constant current of 650 mA to a voltage of 4.2 V, then at a constant voltage of 4.2 V to a current of 32 mA.

Discharging: In a room of 25° C., each of the cells was charged at a constant current of 650 mA to a voltage of 2.75 V.

Cycle characteristic (%)=discharge capacity at 200th cycle/discharge capacity at 1st cycle×100

TABLE 1

| | Washing step | Amount of lithium carbonate on surface of positive electrode active material (mass %) | Amount of lithium carbonate in porous layer (mass %) | Inorganic oxide | Swelling rate (%) | Cycle characteristic (%) |
|---|---|---|---|---|---|---|
| Comparative Example 1 | Performed | 0.1 | — | — | 11 | 50 |
| Comparative Example 2 | Performed | 0.2 | — | — | 24 | 55 |
| Comparative Example 3 | Not Performed | 0.5 | — | — | 123 | 79 |
| Comparative Example 4 | Not Performed | 0.6 | — | — | 216 | 90 |
| Comparative Example 5 | Not Performed | 0.8 | — | — | 220 | 88 |
| Comparative Example 6 | Performed | 0.1 | 0 | $Al_2O_3$ | 13 | 74 |
| Example 1 | Performed | 0.1 | 0.5 | $Al_2O_3$ | 13 | 82 |

Table 1 shows that as the amount of lithium carbonate on the surface of the positive electrode active material increases, the swelling rate tends to increase and the cycle characteristic tends to improve (see comparative examples 1 to 5).

A possible explanation for this is as follows. The larger the amount of lithium carbonate on the surface of the positive electrode active material, the more of the lithium carbonate is decomposed to generate carbon dioxide gas during the high-temperature preservation, thereby swelling the cell on a large scale. Meanwhile, the charge and discharge reactions gradually decompose the lithium carbonate to generate carbon dioxide gas. This carbon dioxide gas moves to the negative electrode to react therewith to form a stable covering film on the surface of the negative electrode. This improves the cycle characteristic.

Table 1 also shows that comparative example 6, whose porous layer contains no lithium carbonate on the surface of the positive electrode, has a cycle characteristic of 74%, which is superior to 50% for comparative example 1, which contains lithium carbonate at the same mass.

A possible explanation for this is as follows. Since the porous layer keeps therein the non-aqueous electrolyte in a preferable manner to supply the non-aqueous electrolyte to the positive electrode active material, the amount of the non-aqueous electrolyte around the positive electrode active material increases. Thus, comparative example 6 has higher cycle characteristic than that of comparative example 1.

Table 1 also shows that example 1, which contains lithium carbonate in the porous layer, has a cycle characteristic of 82%, which is superior to 74% for comparative example 6, which contains no lithium carbonate in the porous layer.

A possible explanation for this is as follows. In example 1, the charge and discharge reactions decompose the lithium carbonate contained in the porous layer to generate carbon dioxide gas. This makes the amount of carbon dioxide gas larger than in comparative example 6. This makes denser the covering film of example 1, which is formed by the reaction between the negative electrode and the carbon dioxide gas. Thus, the cycle characteristic improves in example 1 over comparative example 6.

Example 2

A non-aqueous electrolyte secondary cell according to example 2 was prepared in the same manner as in example 1 except that the amount of lithium carbonate contained in the porous layer was 0.3 mass % relative to the positive electrode active material.

Example 3

A non-aqueous electrolyte secondary cell according to example 3 was prepared in the same manner as in example 1 except that the amount of lithium carbonate contained in the porous layer was 5.0 mass % relative to the positive electrode active material.

Example 4

A non-aqueous electrolyte secondary cell according to example 4 was prepared in the same manner as in example 1 except that the amount of lithium carbonate contained in the porous layer was 10.0 mass % relative to the positive electrode active material.

Example 5

A non-aqueous electrolyte secondary cell according to example 5 was prepared in the same manner as in example 1 except that the amount of lithium carbonate contained in the porous layer was 20.0 mass % relative to the positive electrode active material.

<Cell Characteristic Test>
The cells according to examples 1 to 5 and comparative example 6 were subjected to the above-described high-temperature preservation test and cycle characteristic test. The results are shown in Table 2.

TABLE 2

| | Amount of lithium carbonate on surface of positive electrode active material (mass %) | Amount of lithium carbonate in porous layer (mass %) | Inorganic oxide | Swelling rate (%) | Cycle characteristic (%) |
|---|---|---|---|---|---|
| Comparative Example 6 | 0.1 | 0 | $Al_2O_3$ | 13 | 74 |
| Example 2 | 0.1 | 0.3 | $Al_2O_3$ | 14 | 62 |
| Example 1 | 0.1 | 0.5 | $Al_2O_3$ | 18 | 82 |
| Example 3 | 0.1 | 5.0 | $Al_2O_3$ | 33 | 84 |
| Example 4 | 0.1 | 10.0 | $Al_2O_3$ | 57 | 72 |
| Example 5 | 0.1 | 20.0 | $Al_2O_3$ | 108 | 70 |

Table 2 shows that as the amount of lithium carbonate in the porous layer increases, the swelling rate tends to increase (see comparative example 6, examples 1 to 5).

A possible explanation for this is as follows. The larger the amount of lithium carbonate contained in the porous layer, the more of the lithium carbonate is decomposed to generate carbon dioxide gas during the high-temperature preservation, thereby swelling the cell on a large scale.

Table 2 also shows that when the amount of lithium carbonate contained in the porous layer is 5.0 mass % or less relative to the positive electrode active material, as the amount of lithium carbonate contained in the porous layer increases, the cycle characteristic tends to improve (see comparative example 6, examples 1 to 3).

Table 2 also shows that when the amount of lithium carbonate contained in the porous layer exceeds 5.0 mass % relative to the positive electrode active material, the cycle characteristic tends to be degraded (see examples 4 and 5).

A possible explanation for these is as follows. The charge and discharge reactions decompose the lithium carbonate to generate carbon dioxide gas. This carbon dioxide gas moves to the negative electrode to react therewith to form a stable covering film on the surface of the negative electrode. This improves the cycle characteristic. However, too large a content of the lithium carbonate generates a large amount of carbon dioxide gas, which is detained between the positive and negative electrodes. This is detrimental to the opposing relation between positive and negative electrodes, resulting in degraded cycle characteristic. In view of this, the amount of lithium carbonate contained in the porous layer is preferably 0.5 to 10 mass % relative to the positive electrode active material, more preferably 0.5 to 5.0 mass %.

Example 6

A non-aqueous electrolyte secondary cell according to example 6 was prepared in the same manner as in example 1 except that MgO was used instead of $Al_2O_3$ as the inorganic oxide used for the porous layer.

Example 7

A non-aqueous electrolyte secondary cell according to example 7 was prepared in the same manner as in example 1 except that $ZrO_2$ was used instead of $Al_2O_3$ as the inorganic oxide used for the porous layer.

Example 8

A non-aqueous electrolyte secondary cell according to example 8 was prepared in the same manner as in example 1 except that $TiO_2$ was used instead of $Al_2O_3$ as the inorganic oxide used for the porous layer.

<Cell Characteristic Test>

The cells according to examples 1, 6 to 8 were subjected to the above-described high-temperature preservation test and cycle characteristic test. The results are shown in Table 3.

TABLE 3

| | Inorganic oxide | Swelling rate (%) | Cycle characteristic (%) |
|---|---|---|---|
| Example 1 | $Al_2O_3$ | 18 | 82 |
| Example 6 | MgO | 25 | 80 |
| Example 7 | $ZrO_2$ | 29 | 79 |
| Example 8 | $TiO_2$ | 20 | 78 |

Table 3 shows that use of any inorganic oxide, $Al_2O_3$, MgO, $ZrO_2$, or $TiO_2$, provides preferable performance.

(Supplemental Remarks)

While in the above examples the washing step involves removing water, the lithium nickel composite oxide may be washed by running water.

The thickness of the porous layer is preferably 1.0 to 5.0 μm.

INDUSTRIAL APPLICABILITY

As has been described above, the present invention realizes a non-aqueous electrolyte secondary cell that has high capacity and excellent cycle characteristic. Thus, the industrial applicability of the present invention is considerable.

What is claimed is:

1. A non-aqueous electrolyte secondary cell comprising:
    a positive electrode having a positive electrode active material layer;
    a negative electrode having a negative electrode active material layer; and
    a non-aqueous electrolyte having a non-aqueous solvent and electrolytic salt, wherein:
    the positive electrode active material layer comprises particles of lithium nickel composite oxide represented by $Li_xNi_{1-y}M_yO_z$ where $0.9 < x \leq 1.1$, $0 \leq y \leq 0.7$, $1.9 \leq z \leq 2.1$, and M contains at least one selected from Al, Co, and Mn;
    lithium carbonate exists on the surface of the particles of the lithium nickel composite oxide in an amount restricted to up to 0.20 mass % relative to the lithium nickel composite oxide; and
    a porous layer is formed on the positive electrode active material layer, the porous layer containing inorganic oxide and lithium carbonate in a mixed state.

2. The non-aqueous electrolyte secondary cell according to claim 1, wherein the amount of lithium carbonate contained in the porous layer is 0.5 to 10 mass % relative to the positive electrode active material.

3. The non-aqueous electrolyte secondary cell according to claim 1, wherein the inorganic oxide is at least one compound selected from the group consisting of $Al_2O_3$, MgO, $ZrO_2$, and $TiO_2$.

4. The non-aqueous electrolyte secondary cell according to claim 1, wherein the negative electrode active material is composed of a carbon material.

5. The non-aqueous electrolyte secondary cell according to claim 1, wherein the thickness of the porous layer is 1.0 to 5.0 μm.

6. A method for producing a non-aqueous electrolyte secondary cell comprising:

a positive electrode having a positive electrode active material layer containing particles of lithium nickel composite oxide as a positive electrode active material, the lithium nickel composite oxide being represented by $Li_xNi_{1-y}M_yO_z$ where $0.9<x\leq1.1$, $0\leq y\leq0.7$, $1.9\leq z\leq2.1$, and M contains at least one selected from Al, Co, and Mn;

a negative electrode having a negative electrode active material layer; and a non-aqueous electrolyte having a non-aqueous solvent and electrolytic salt, wherein the method comprises the steps of:

washing the particles of the lithium nickel composite oxide with water until the amount of lithium carbonate becomes an amount restricted to up to 0.2 mass %;

preparing the positive electrode by causing a positive electrode current collector to hold the positive electrode active material containing the washed particles of the lithium nickel composite oxide having the amount of lithium carbonate restricted to up to 0.2 mass %, as obtained in the washing step; and forming a porous layer on the positive electrode active material layer held in the positive electrode current collector, the porous layer having inorganic oxide and lithium carbonate.

7. The method according to claim 6, wherein the porous layer forming step comprises applying a slurry containing inorganic oxide, lithium carbonate, and a binding agent onto the surface of the positive electrode and drying the resulting product.

8. The method according to claim 7, wherein the thickness of the porous layer is 1.0 to 5.0 μm.

9. The method according to claim 6, wherein the amount of the lithium carbonate contained in the porous layer is 0.5 to 10 mass % relative to the positive electrode active material.

10. The method according to claim 6, wherein the inorganic oxide is at least one compound selected from the group consisting of $Al_2O_3$, MgO, $ZrO_2$, and $TiO_2$.

11. The method according to claim 6, wherein the negative electrode active material is composed of a carbon material.

* * * * *